United States Patent
Kim

(10) Patent No.: US 11,344,893 B2
(45) Date of Patent: May 31, 2022

(54) WATER TREATMENT HYDRO-CRUSHER HAVING FILTER CLEANING FUNCTION AND USING FRICTION AND COLLISION OF SOLID PARTICLES MOVING IN VORTEX

(71) Applicants: Hyung Oh Kim, Ulsan (KR); Yong Jae Lee, Gyeongsangbuk-do (KR); Keun Hyung Choi, Daejeon (KR)

(72) Inventor: Hyung Oh Kim, Ulsan (KR)

(73) Assignee: Hyung Oh Kim, Ulsan (KR)

( * ) Notice: Subject to any disclaimer, the term of this patent is extended or adjusted under 35 U.S.C. 154(b) by 404 days.

(21) Appl. No.: 16/045,096

(22) Filed: Jul. 25, 2018

(65) Prior Publication Data
US 2018/0353967 A1 Dec. 13, 2018

Related U.S. Application Data

(63) Continuation of application No. PCT/KR2017/005217, filed on May 19, 2017.

(30) Foreign Application Priority Data

| May 20, 2016 | (KR) | .......................... 10-2016-0062091 |
| May 25, 2016 | (KR) | .......................... 10-2016-0063823 |
| May 25, 2016 | (KR) | .......................... 10-2016-0063830 |

(51) Int. Cl.
*B02C 19/00* (2006.01)
*B01D 29/03* (2006.01)
(Continued)

(52) U.S. Cl.
CPC ............ *B02C 19/005* (2013.01); *B01D 29/01* (2013.01); *B01D 29/03* (2013.01); *B01D 29/66* (2013.01);
(Continued)

(58) Field of Classification Search
CPC .................................. B01J 8/14; B01J 8/1845
See application file for complete search history.

(56) References Cited

U.S. PATENT DOCUMENTS

| 3,149,789 | A | * | 9/1964 | Szegvari | ................... B01F 7/16 |
| | | | | | 241/27 |
| 3,481,474 | A | * | 12/1969 | Paulson | ............... B01D 29/908 |
| | | | | | 210/304 |

(Continued)

FOREIGN PATENT DOCUMENTS

| KR | 10-2010-0062131 A | 6/2010 |
| KR | 10-1230352 B1 | 2/2013 |

(Continued)

OTHER PUBLICATIONS

International Search Report (ISR) from corresponding PCT Application No. PCT/KR2017/005217, dated Sep. 19, 2017, and it's English translation.

*Primary Examiner* — David C Mellon
(74) *Attorney, Agent, or Firm* — Harness, Dickey & Pierce, P.L.C.

(57) ABSTRACT

According to an embodiment of the present disclosure, there is provided a hydro crusher for water treatment, for removing living organisms from water to be treated, the hydro crusher including: a body portion which has a cylindrical shape having an inner space, and includes an inflow portion to allow the water to be treated to be drawn into the inner space therethrough, and a discharge portion to discharge the water to be treated, drawn in through the inflow portion; and solid particles which are movable by the water to be treated, wherein the movable solid particles are filled in at least a portion of the inner space.

9 Claims, 8 Drawing Sheets

(51) Int. Cl.
  *B01D 29/90* (2006.01)
  *B01D 35/02* (2006.01)
  *B01D 29/01* (2006.01)
  *B01D 29/66* (2006.01)
  *B01D 39/10* (2006.01)
  *B02C 23/10* (2006.01)
  *B63J 4/00* (2006.01)
  *C02F 1/32* (2006.01)
  *C02F 1/78* (2006.01)
  *C02F 1/00* (2006.01)
  *C02F 103/00* (2006.01)
  *C02F 103/02* (2006.01)

(52) U.S. Cl.
  CPC ........... *B01D 29/908* (2013.01); *B01D 35/02* (2013.01); *B01D 39/10* (2013.01); *B02C 23/10* (2013.01); *B63J 4/002* (2013.01); *C02F 1/004* (2013.01); *C02F 1/32* (2013.01); *C02F 1/78* (2013.01); *C02F 2103/008* (2013.01); *C02F 2103/023* (2013.01); *C02F 2301/026* (2013.01); *C02F 2303/04* (2013.01); *C02F 2303/16* (2013.01)

(56) References Cited

U.S. PATENT DOCUMENTS

| | | | | |
|---|---|---|---|---|
| 3,807,568 A | * | 4/1974 | Ruthrof | B01D 29/15 |
| | | | | 210/304 |
| 3,855,120 A | * | 12/1974 | Garbo | C02F 3/085 |
| | | | | 210/618 |
| 5,024,771 A | * | 6/1991 | Chiarito | B01D 29/114 |
| | | | | 210/791 |
| 5,401,397 A | * | 3/1995 | Moorehead | B01D 29/114 |
| | | | | 210/108 |
| 6,517,724 B1 | * | 2/2003 | Malone | C02F 3/06 |
| | | | | 210/618 |
| 2005/0178649 A1 | * | 8/2005 | Liedy | B01J 8/06 |
| | | | | 204/157.15 |

FOREIGN PATENT DOCUMENTS

| KR | 10-1306596 B1 | 9/2013 |
|---|---|---|
| KR | 10-2015-0055159 A | 5/2015 |
| KR | 10-2015-0056150 A | 5/2015 |

* cited by examiner

WATER TREATMENT HYDRO-CRUSHER HAVING FILTER CLEANING FUNCTION AND USING FRICTION AND COLLISION OF SOLID PARTICLES MOVING IN VORTEX

CROSS REFERENCE TO RELATED APPLICATIONS

The present application is a continuation of PCT/KR2017/005217, filed on 19 May 2017, which claims priority to Korean Patent Application Nos. 10-2016-0062091, filed on 20 May 2016, 10-2016-0063823, filed on 25 May 2016, and 10-2016-0063830, filed on 25 May 2016. The entire disclosure of the applications identified in this paragraph are incorporated herein by reference.

TECHNICAL FIELD

The present disclosure relates to a hydro crusher for water treatment provided with a filter cleaning function, and using friction and collision of particles moving in a vortex flow.

BACKGROUND

From among devices using water, some devices should not have living organisms. For example, a cooling system used in a nuclear power plant or a liquefied natural gas (LNG) power plant uses sea water, and removes marine organisms included in the sea water by using electrolysis and ozonization, in order to increase cooling efficiency. In another example, ballast water should not include marine organisms, and the marine organisms are removed through electrolysis, ozonization, or chemical treatment.

DETAILED DESCRIPTION

Technical Objects

One or more embodiments of the present disclosure provide a hydro crusher for water treatment using friction and collision of particles moving in a vortex flow.

One or more embodiments of the present disclosure provide a hydro crusher for water treatment provided with a filter cleaning function.

Technical Solving Means

According to an embodiment of the present disclosure, there is provided a hydro crusher for water treatment, for removing living organisms from water to be treated, the hydro crusher including: a body portion which has a cylindrical shape having an inner space, and includes an inflow portion to allow the water to be treated to be drawn into the inner space therethrough, and a discharge portion to discharge the water to be treated, drawn in through the inflow portion; and solid particles which are movable by the water to be treated, wherein the movable solid particles are filled in at least a portion of the inner space.

Advantageous Effect

According to one or more embodiments of the present disclosure, there is an effect that physical sterilization is possible by killing or inactivating living organism included in ballast water by applying a shock to the living organism, by using movable particles, such as particles mixed with alumina, silicon carbide, ceramic beads, silicon material, or the like, which are moved by a vortex flow of water to be treated.

The hydro crusher for water treatment according to an embodiment of the present disclosure performs physical sterilization by using a flow velocity and a pressure of water to be treated, flowing into the hydro crusher, and thus does not require a separate driving force for the hydro crusher.

According to one or more embodiments of the present disclosure, a nozzle for spraying a back washing material to the hydro crusher for water treatment using moving particles is included, thereby removing foreign substances attached to a filter.

EXPLANATION OF SIGNS

Figure 1:
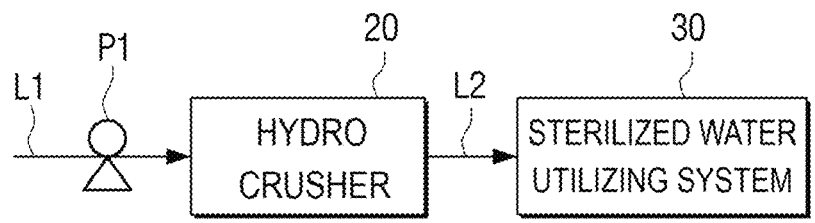
FIG. 1 is a view to illustrate a water treatment system using a hydro crusher for water treatment according to an embodiment of the present disclosure.

20, 120, 220, 320, 420, 520, 620: hydro crusher
30: sterilization water utilizing system
50, 150, 250, 350, 450, 550: moving particles
60, 360, 560: filter
70: backflow prevention valve
590, 690: nozzle
H1, H11, H21, H31, H41, H51: inflow portion
H2, H12, H22, H32, H42, H52: discharge portion
25, 125, 225, 325, 525: body portion
27, 327: column

SUMMARY

The above-described objects of the present disclosure, other objects, features, and advantages will be easily understood through the accompanying drawings and preferred embodiments presented hereinbelow. Exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that, when an element is referred to as being "on" another element, the element can be directly on another element or intervening elements. In the drawings, thickness of elements is exaggerated for easy understanding of technical features.

The expressions such as "upper (top)," "lower (bottom)," "left," "right," "front," "rear," etc. used in the specification to explain a location relationship between elements do not mean a directions or location as an absolute criterion, and are relative expressions used for convenience of explanation with reference to a corresponding drawing when the present disclosure is explained with reference to each drawing.

Embodiments described in the specification of the present application will be described with reference to cross-sectional views and/or top views which are ideal example views of the present disclosure. Although the terms such as 'first' and 'second' are used in various embodiments of the present disclosure to describe various elements, these elements should not be limited by such terms. These terms are only used for the purpose of distinguishing one element from another element. The exemplary embodiments include their complementary embodiments.

The terms used herein are for the purpose of describing embodiments only and are not intended to be limiting. As used herein, singular forms are intended to include the plural forms as well, unless the context clearly indicates otherwise.

It will be further understood that the terms "comprises" and/or "comprising," when used in this specification, do not preclude the presence or addition of one or more other components.

Hereinafter, the present disclosure will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the present disclosure. Terms In the specification of the present application, "water to be treated" refers to ballast water, coolant used in a cooling tower, stream water, or water that requires water treatment such as sterilization, purification, or the like in a filtration plant, a sewage treatment plant, a cage fish farm, or the like, and expression "treating," "killing", or "sterilizing" water to be treated refers to killing or inactivating living organisms (for example, zooplankton, phytoplankton, germs) included in water to be treated.

FIG. 1 is a view to illustrate a water treatment system using a hydro crusher for water treatment according to an embodiment of the present disclosure. Referring to FIG. 1, the water treatment system according to the present embodiment may include a hydro crusher 20 for water treatment (hereinafter, referred to as "hydro crusher"), a sterilized water utilizing system 30, an inflow line L1 through which water to be treated flows into the hydro crusher for water treatment, a discharge line L2 through which water sterilized in the hydro crusher is discharged, and a pump P1.

The hydro crusher 20 according to the present embodiment includes particles (hereinafter, "moving particles") which are moved by a vortex flow generated according to a shape of the hydro crusher 20 and a flow velocity and a hydraulic pressure of the water to be treated. The moving particles collide with one another, cause friction therebetween, and are crushed to formations, while being rotated by the vortex flow generated in the hydro crusher. Living organisms included in the water to be treated may be killed or inactivated by colliding with the moving particles, which collide with one another and cause friction. The hydro crusher 20 according to an embodiment of the present disclosure is configured to keep the moving particles included therein without discharging the moving particles to the outside by the water to be treated.

The water to be treated is pumped by the pump P1 installed on the inflow line L1, and flows into the hydro crusher 20. The living organisms included in the water to be treated, drawn into the hydro crusher 20, are killed by physical movements of the particles, such as collision, friction, or the like, which are moved by the vortex flow generated according to the shape of the hydro crusher 20 and the flow velocity and the hydraulic pressure of the water to be treated, and then the water to be treated is discharged to the outside of the hydro crusher 20.

The hydro crusher 20 will be described in greater detail below with reference to FIGS. 2 to 8.

The sterilized water utilizing system 30 refers to a system which is installed to be connected to the discharge line L2, through which water sterilized by passing through the hydro crusher 20 is discharged, and utilizes the sterilized water discharged from the hydro crusher 20, and may be a cooling system of a power plant or a system requiring water treatment such as sterilization, purification, or the like such as cage fish farm. However, this is merely an example and the present disclosure is not limited thereto.

For example, in the case of coolant used in a cooling system of a power plant, sea water or river water is mainly used. To prevent tiny living organisms included in sea water or river water, such as plankton, from hindering a cooling operation of the cooling system, the cooling system may utilize the water sterilized by the hydro crusher 20.

Figure 2A:
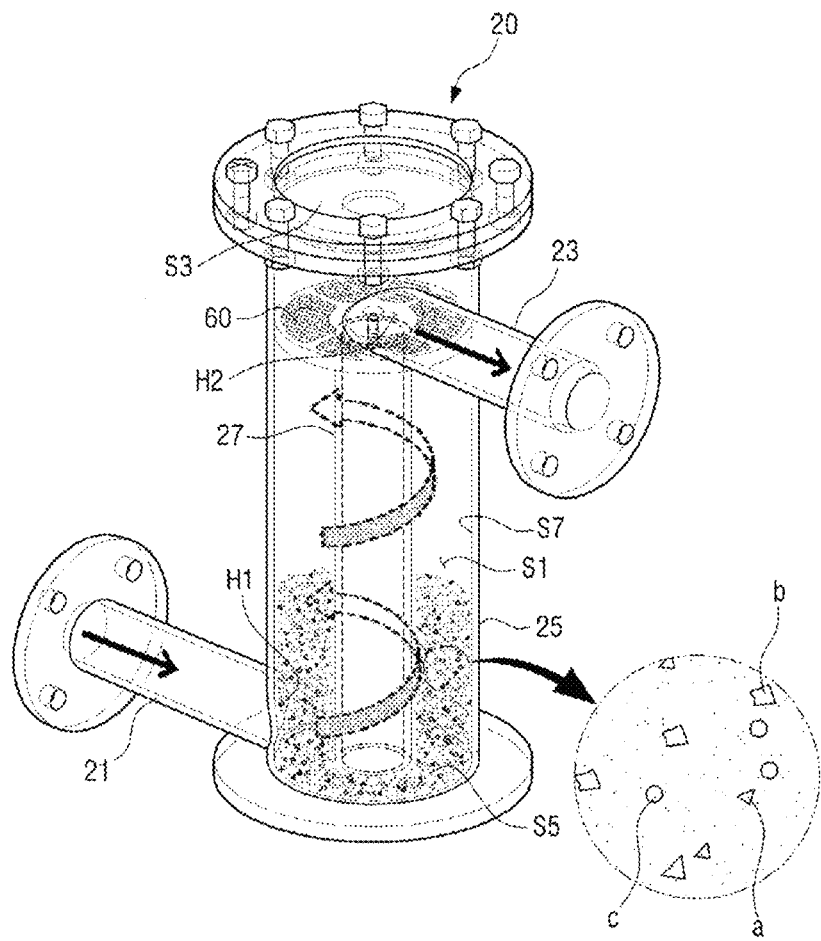
FIG. 2A and FIG. 2B are views to illustrate a hydro crusher for water treatment according to an embodiment of the present disclosure.
Figure 2B:
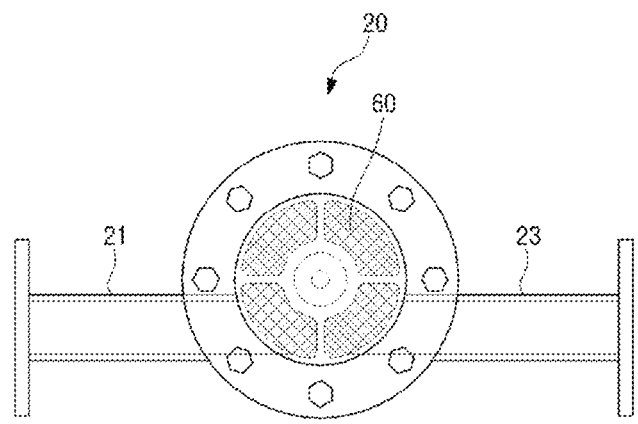
Figure 3:
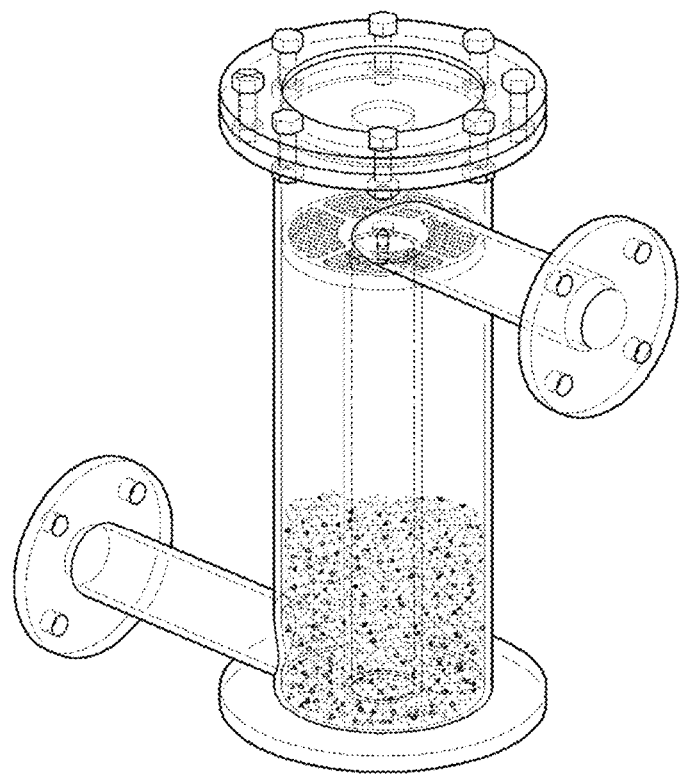
FIG. 3 is a view to illustrate the hydro crusher for water treatment according to the embodiment of FIG. 2.

FIGS. 2A and 2B are views to illustrate a hydro crusher for water treatment according to an embodiment of the present disclosure, and FIG. 3 is a view to illustrate the hydro crusher for water treatment according to the embodiment of FIG. 2.

Referring to FIGS. 2A, 2B, and 3, the hydro crusher 20 according to an embodiment of the present disclosure may include a body portion 25, a column 27, an inflow portion H1, a discharge portion H2, moving particles 50, and a filter 60. Herein, the moving particles 50 may be referred to as media 50, and the "moving particles" and the "media" have the same meaning in the specification of the present application.

In the present embodiment, the body portion 25 has a container shape having an inner space S1, and, for example, may be formed in a cylindrical shape as shown in FIG. 2. However, this is merely an example, and the present disclosure is not limited thereto. The inner space S1 may be formed of inner surfaces forming the inner space S1, that is, an upper surface S3, a lower surface S5, and a side surface S7.

The moving particles 50, which are movable according to the present embodiment, may be formed of a mixture in which solid particles a, b having hardness strong enough to sterilize living organism included in the water to be treated, and silicon particles c for preventing abrasion of the solid particles a, b having strong hardness, and for increasing a restitution coefficient are mixed. The moving particles are movable by the water to be treated, which is drawn in through the inflow portion H1.

For example, the moving particles 50 may be mixed by including at least one of alumina, silicon carbide, ceramic beads, and silicon material. This mixture is merely an example, and any particles that have strong hardness may be used. The moving particles 50 are rotated by the water to be treated, which is drawn in through the inflow portion H1, and alumina, silicon carbide, ceramic beads, and silicon material forming the moving particles 50 collide with one another. The water to be treated is sterilized in the process of passing between the moving particles 50 causing friction.

Preferably, the moving particles 50 may be heavy and large enough to be moved (including an upward movement) by the water to be treated. The moving particles 50 should be heavy and large enough to be moved up by the water to be treated, and then the moving particles 50 collide with one another, and accordingly, the water to be treated is sterilized.

The hydro crusher 20 according to the present embodiment may include the filter 60. The filter 60 allows the water to be treated to pass therethrough, and may perform one or more of the following operations of:

preventing the moving particles 50 from being discharged to the discharge portion H2; and preventing dead organisms and foreign substances existing in the water to be treated from being discharged to the discharge portion H2.

The filter 60 according to an embodiment of the present disclosure is disposed between the inflow portion H1 and the discharge portion H2. For example, the filter 60 is configured to make sure that the water to be treated, drawn into the inner space Si of the hydro crusher 20 through the inflow portion H1, passes through the filter 60 and then is discharged through the discharge portion H2.

The filter 60 according to an embodiment of the present disclosure is formed in a net structure such as a mesh, and for example, may be formed of a metal net filter, but this is merely an example, and the present disclosure is not limited thereto.

The hydro crusher 20 according to the present embodiment may further include at least one column 27 to enhance the rotational force of the water to be treated, drawn into the inner space S1 through the inflow portion H1.

At least a portion of the column 27 is connected to the inner surfaces forming the inner space S1. For example, one end of the column 27 may be connected to any one of the upper surface S3 or the lower surface S5. Alternatively, one end of the column 27 may be connected to any one of the filter 60 or the lower surface S5.

As shown in FIG. 2A, the column 27 may be disposed at the center of the inner space Si to form a center axis (hereinafter, referred to as a "center axis") in the inner space Si of the body portion 25, and one end of the column 27 may be connected to the lower surface S5 of the inner surfaces forming the inner space S1, and the other end of the column 27 may be connected to the filter 60. This connection is merely an example and connection may be achieved by other methods.

In the present embodiment, the body portion 25 includes the inflow portion H1 through which the water to be treated is drawn into the inner space S1, and the discharge portion H2 through which the water to be treated, drawn in through the inflow portion H1, is discharged.

The inflow portion H1 is a portion which is filled with the moving particles 50, and is disposed to allow the water to be treated to be drawn in therethrough. For example, as shown in FIG. 2A, the inflow portion H1 may be disposed on the side surface S7 of the inner surfaces adjacent to the lower surface S5.

The discharge portion H2 may be connected to at least one of the side surface S7 or the upper surface S3 of the inner surfaces of the body portion 25. For example, the discharge portion H2 may be disposed on the side surface S7 between the filter 60 and the upper surface S3 as shown in FIG. 2A.

Referring to FIGS. 2A and 2B, the hydro crusher 20 according to the present embodiment may further include an inflow pipe 21 and a discharge pipe 23. The inflow pipe 21 has one side connected to the inflow portion H1, and the other side connected to the inflow line L1. The discharge pipe 23 has one side connected to the discharge portion H2, and the other side connected to the discharge line L2.

The above-described configuration of the hydro crusher 20 including the inflow pipe 21 and the discharge pipe 23 is an example, and the hydro crusher 20 may not include the inflow pipe 21 and the discharge pipe 23.

Figure 4A:
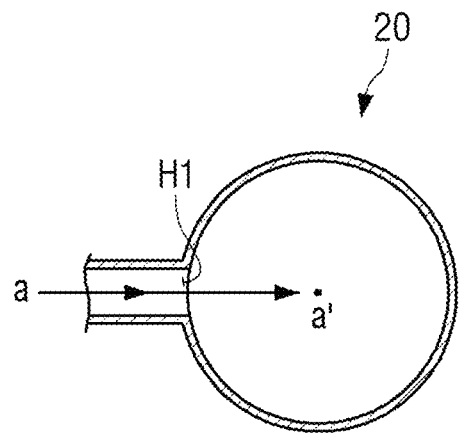
FIG. 4A and FIG. 4B are views to illustrate an inflow portion of a hydro crusher for water treatment according to an embodiment of the present disclosure.
Figure 4B:
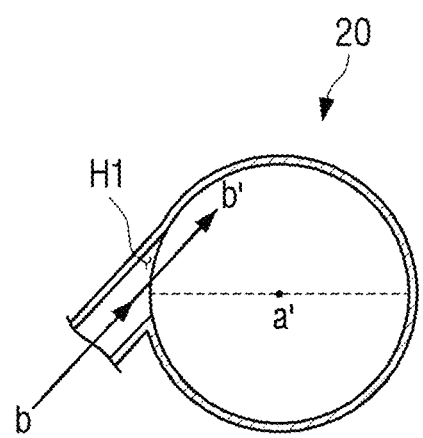

FIGS. 4A and 4B are views to illustrate the inflow portion of the hydro crusher for treating water to be treated.

Referring to FIG. 4A, the inflow portion H1 may be disposed to allow the water to be treated, drawn in through the inflow portion H1, to flow in a direction a toward the center axis a' of the inner space. Alternatively, as shown in FIG. 4B, the inflow portion H1 may be disposed to allow the water to be treated to flow in a direction b (hereinafter, an "oblique direction") toward an axis b', which slightly deviates from the center axis a', without moving toward the center axis a' of the inner space. In this case, the rotational force of the water to be treated, drawn into the hydro crusher 20, is further enhanced than when the water is drawn in in the direction toward the center axis a'.

Figure 5A:
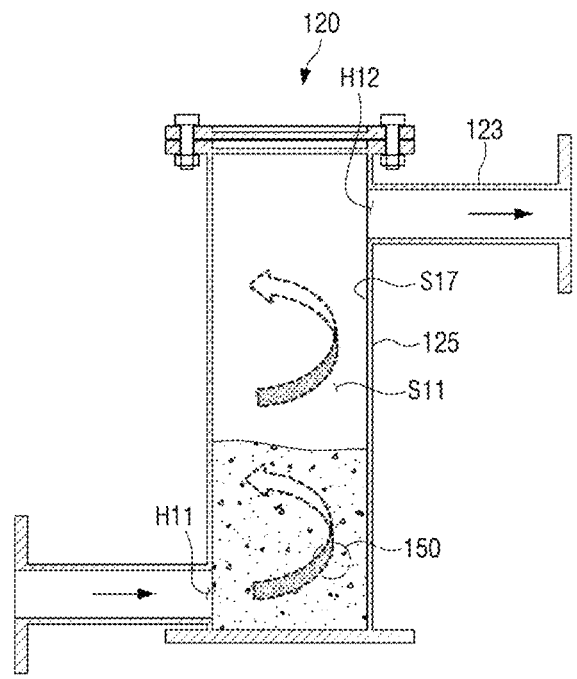
FIGS. 5A, 5B, 6, 7 and 8 are views to illustrate a hydro crusher for water treatment according to another embodiment of the present disclosure.
Figure 5B:
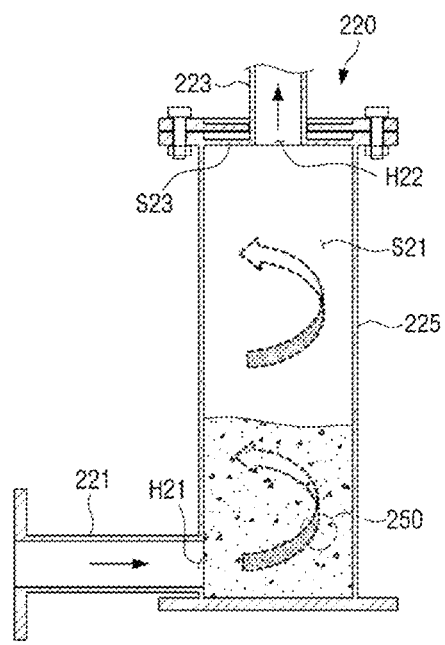

FIGS. 5A and 5B are views illustrating a hydro crusher for treating water to be treated according to another embodiment of the present disclosure. FIG. 5A illustrates an embodiment in which a discharge portion H12 is formed on a side surface of a body portion, and FIG. 5B illustrates an embodiment in which a discharge portion H22 is formed on an upper surface of a body portion.

Referring to FIG. 5A, A hydro crusher 120 for treating water to be treated according to another embodiment of the present disclosure may include a body portion 125, an inflow portion H11, moving particles 150, and a discharge portion H12, and referring to FIG. 5B, a hydro crusher 220 for treating water to be treated according to another embodiment of the present disclosure may include a body portion 225, an inflow portion H21, moving particles 250, and a discharge portion H22.

First, comparing the embodiment of FIG. 5A and the embodiment of FIG. 2, the embodiment of FIG. 5A differs from the embodiment of FIG. 2 in that the hydro crusher includes the body portion 125, the inflow portion H11, the discharge portion H12, and the moving particles 150, but does not include the filter and the column.

The embodiment of FIG. 5A is the same as the embodiment of FIG. 2 except for that the hydro crusher does not include the filter and the column.

That is, in the embodiment of FIG. 5A, the body portion 125 has the inflow portion H11 and the discharge portion H12 formed thereon to fluidly communicate with the inner space of the body portion 125, and at least a portion of the inner space S11 is filled with the moving particles 150. Herein, the inflow portion H11 may be disposed to allow the water to be treated, drawn in through the inflow portion H11, to flow in a direction toward the center axis of the inner space S11, or to flow in an oblique direction (see FIG. 4).

In addition, the inflow portion H11 is a portion filled with the moving particles 150, and may be disposed to allow the water to be treated to be drawn in therethrough, and the discharge portion H12 may be connected to at least one of a side surface S17 or an upper surface S13 of inner surfaces of the body portion. For example, as shown in FIG. 5A, the discharge portion H12 may be disposed on the side surface S17 of the inner surfaces.

Regarding the embodiment of FIG. 5A, reference is made to the description of the embodiment of FIG. 2.

The embodiment of FIG. 5B is the same as the embodiment of FIG. 5A except for that the discharge portion is disposed on an upper surface S23 of the body portion 225, and thus a description thereof is omitted.

Figure 6:
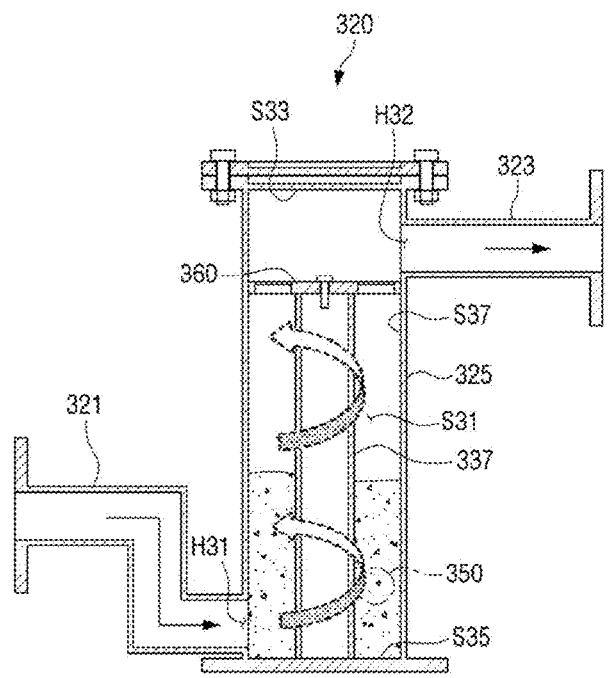

FIG. 6 is a view to illustrate a hydro crusher for treating water to be treated according to another embodiment of the present disclosure.

Referring to FIG. 6, the hydro crusher 320 according to another embodiment of the present disclosure may include a body portion 325, a column 327, an inflow portion H31, a discharge portion H32, moving particles 350, and a filter 360. In addition, the present embodiment may include an inflow pipe 321 connected with the inflow portion H31, and a discharge pipe 323 connected with the discharge portion H32.

Comparing the embodiment of FIG. 2 and the embodiment of FIG. 6, the embodiment of FIG. 2 provides the structure (hereinafter, referred to as a "straight structure") having the inflow pipe 21 connected to the inflow portion H1 in parallel with the ground, whereas the embodiment of FIG. 6 provides a structure in which the inflow pipe 321 connected to the inflow portion H31 has a portion bent from the ground in the opposite direction of the ground (hereinafter, an "upward bending structure"). Except for this feature, the structures of the embodiments of FIGS. 2 and 6 are the same.

The upward bending structure in the present embodiment refers to a structure having a portion bent in the opposite direction of the direction of gravity, and refers to a structure having a portion bent at least one time in the direction from a lower surface S35 to an upper surface S33 of the inner spaces.

Since the embodiment of FIG. 6 includes the inflow pipe 321 having the upward bending structure, the moving particles 350 existing in the hydro crusher 320 are prevented from being discharged to the outside through the inflow portion H31. That is, if the portion of the inflow pipe 321 bent in the opposite direction of the ground has an enough length, it would be unlikely that the moving particles 350 existing in the hydro crusher 320 are discharged to the outside.

The inflow portion H31 of the hydro crusher 320 according to the embodiment of FIG. 6 may be disposed to allow the water to be treated, drawn into the inflow portion H31, to flow in the direction toward the center axis of the inner space S31, or may be disposed to allow the water to be treated to flow in the oblique direction (see FIG. 4).

The inflow portion H31 is a portion filled with the moving particles 350, and may be disposed to allow the water to be treated to be drawn in therethrough, and the discharge portion H32 may be connected to at least one of a side surface S7 or the upper surface S33 of THE inner surfaces of the body portion as described in FIG. 2.

Regarding elements which have not been described in the embodiment of FIG. 6, reference is made to the description of the embodiment of FIG. 2.

Figure 7:
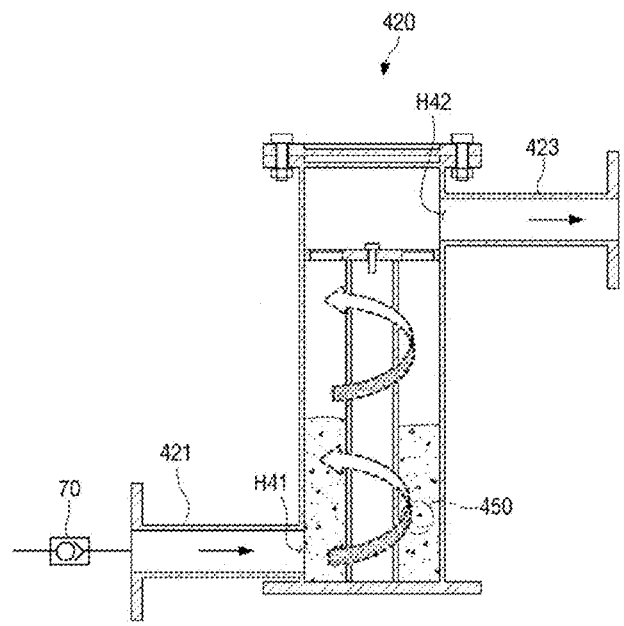

FIG. 7 is a view to illustrate a hydro crusher for treating water to be treated according to another embodiment of the present disclosure.

Referring to FIG. 7, the hydro crusher 420 according to another embodiment of the present disclosure may include a body portion 425, a column 427, an inflow portion H41, a discharge portion H42, moving particles 450, and a filter 460. In addition, the hydro crusher 420 of the present embodiment may include an inflow pipe 421 connected with the inflow portion H41, and a discharge pipe 423 connected with the discharge portion H42.

Comparing the embodiment of FIG. 7 and the embodiment of FIG. 6, the embodiment of FIG. 6 provides the upward bending structure of the inflow pipe 321 to prevent the water to be treated or the moving particles from being discharged, whereas the embodiment of FIG. 7 provides a backflow prevention valve 70 installed on the inflow pipe 421 connected to the inflow portion H41. Except for these features, the structures of the embodiments of FIGS. 6 and 7 are the same. Hereinafter, the difference from the embodiment of FIG. 6 will be highlighted.

The inflow pipe 421 according to the embodiment of FIG. 7 may have the backflow prevention filter 70 installed on the inflow pipe 421, for example, a foot valve, to prevent water to be treated, drawn in through the inflow pipe 421 connected to the inflow portion H41, from flowing backward through the inflow pipe 421.

The backflow prevention valve 70 only allows the water to be treated to flow to the inflow portion H41 of the hydro crusher 420 from the inflow pipe 421.

Accordingly, the moving particles 450 existing in the hydro crusher 420 are prevented from being discharged to the outside through the inflow portion H41.

The inflow pipes according to the embodiment of the present disclosure described above with reference to FIGS. 6 and 7 may be implemented by being connected to the inflow portions of the embodiments of FIGS. 2 and 5. That is, the embodiments of FIGS. 2 and 5 may be changed by connecting an inflow pipe of an upward bending type or an inflow pipe having a backflow prevention valve installed thereon to the inflow portions H1, H11.

Figure 8:
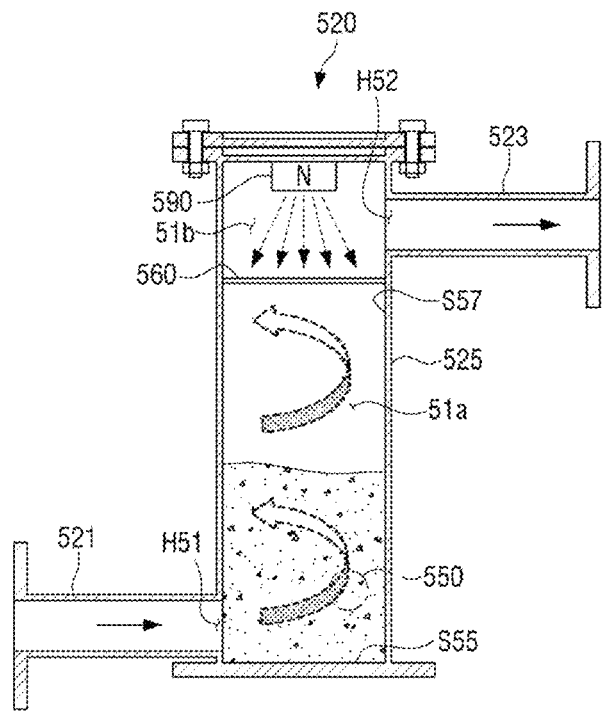

FIG. 8 is a view to illustrate a hydro crusher for water treatment which includes a nozzle according to another embodiment of the present disclosure.

Referring to FIG. 8, the hydro crusher 520 according to another embodiment of the present disclosure may include a body portion 525, an inflow portion H51, a discharge portion H52, moving particles 550, a filter 560, and a nozzle 590.

Compared with the embodiment of FIG. 2, the embodiment of FIG. 8 differs from the embodiment of FIG. 2 in that the hydro crusher further includes the nozzle 590 and does not include a column.

The embodiment of FIG. 8 is the same as the embodiment of FIG. 2 in that the hydro crusher includes the body portion 525, the inflow portion H51, the discharge portion H52, the moving particles 550, and the filter 560.

That is, in the embodiment of FIG. 8, the body portion 525 has a cylindrical shape having an inner space therein, and for example, may be formed in a cylindrical shape as shown FIG. 2. However, this is merely an example, and the present disclosure is not limited thereto. The inner space may be formed of inner surfaces forming the inner space, that is, an upper surface S53, a lower surface S55, and a side surface S57.

The body portion 525 may have the inflow portion H51 and the discharge portion H52 fluidly communicating with the inner space of the body portion 525, and at least a portion of a first region 51a is filled with the moving particles 550. Herein, the inflow portion H51 may be disposed to allow water to be treated, drawn in through the inflow portion H51, to flow in a direction toward a center axis of the first region 51a, or may be disposed to allow the water to be treated to flow in an oblique direction (see FIG. 3).

In addition, the inflow portion H51 is a portion filled with the moving particles 550, and may be disposed to allow the water to be treated to be drawn in therethrough, and the discharge portion H52 may be connected to at least one of the side surface S57 or the upper surface S53 of the inner surfaces of the body portion. For example, as shown in FIG. 8, the discharge portion H52 may be disposed on the side surface S57 of the inner surfaces as shown in FIG. 8.

The filter 560 may allow ballast water to pass therethrough, and may perform one or more of the following operations of:

preventing the moving particles 550 from being discharged to the discharge portion H52; and preventing dead organisms or foreign substances existing in the water to be treated from being discharged to the discharge portion H52.

According to the present embodiment, the filter 560 may be disposed between the inflow portion H51 and the discharge portion H52 to make sure that the ballast water, drawn in the hydro crusher 520 through the inflow portion H51, passes through the filter 560, and then is discharged through the discharge portion H52. Herein, the inner space of the hydro crusher 520 may be divided into the first region 51a and a second region 51b by the filter 560. The inner space between the inflow portion H51 and the filter 560 is referred to as the first region 51a, and the inner space between the filter 560 and the discharge portion H52 is referred to as the second region 51b for the sake of explanation of the present embodiment.

For example, the water to be treated, drawn in the first region 51a of the hydro crusher 520 through the inflow portion H51, surely passes through the filter 560 and then is discharged through the discharge portion H52 via the second region 51b.

A detailed description of the embodiment of FIG. 8 may be replaced with the description of the embodiment of FIG. 2.

The embodiment of FIG. 8 further includes the nozzle 590, which is different from the embodiment of FIG. 2.

The nozzle 590 may receive a back washing material and may spray the received back washing material over the filter 560, thereby removing foreign substances attached to the filter 560.

According to an embodiment, the back washing material may be water to be treated or air, and the nozzle 590 may be disposed in the second region 51b of the hydro crusher 520 to spray the back washing material over the filter 560. Referring to FIG. 8, the second region 51b may include the upper surface S53 and the side surface S57 from among the inner surfaces forming the inner space of the body portion 525. According to the present embodiment, the nozzle 590 may be disposed on the upper surface S53 of the second region 51b, and may spray the back washing material over the filter 560 in the second region, thereby removing foreign substances attached to the filter.

According to another embodiment, the hydro crusher 520 may further include at least one column (not shown) to enhance the rotational force of the water to be treated, which is drawn in the inner space through the inflow portion H51.

At least a portion of the column is connected to the inner surface forming the inner space. For example, one end of the column may be connected to any one of the upper surface S53 or the lower surface S55. Alternatively, one end of the column may be connected to any one of the filter 560 or the lower surface S55.

Figure 9:
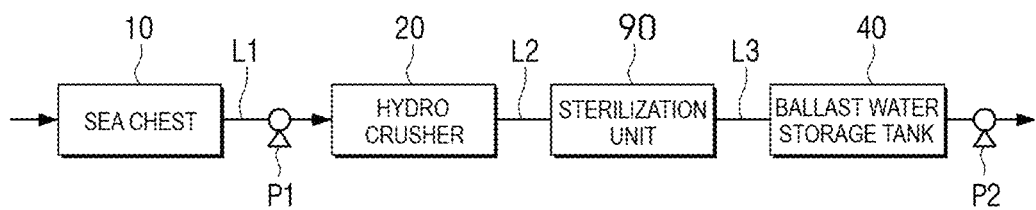
FIG. 9 is a view to illustrate an example of using a hydro crusher for water treatment according to an embodiment of the present disclosure in a ballast water treatment system.

FIG. 9 is a view to illustrate an embodiment in which a ballast water treatment system uses a hydro crusher for water treatment according to an embodiment of the present disclosure.

Referring to FIG. 9, the ballast water treatment system using the hydro crusher for water treatment according to an embodiment of the present disclosure may include a sea chest 10, a ballast water storage tank 40 storing sterilized ballast water, ballast water main pipes L1, L2, L3, a ballast water treatment hydro crusher 20 (hereinafter, a "hydro crusher"), and a pump P1.

The sea chest 10 is a place into which sea water is drawn from the sea to be used as ballast water. The ballast water drawn in the sea chest 10 is supplied to the hydro crusher 20 through the ballast water main pipe L1 connected to the sea chest 10. Herein, the ballast water flowing through the ballast water main pipe L1 may be pumped by the pump P1 installed on the main pipe L1, and may be supplied to the hydro crusher 20.

The hydro crusher 20 according to the present embodiment includes particles (hereinafter, moving particles) which are moved by a vortex flow generated according to the shape of the hydro crusher and a flow velocity and a hydraulic pressure of the ballast water, and the moving particles collide with one another, cause friction, and are crushed into formations, while being rotated by the vortex flow generated in the hydro crusher. Living organisms included in the ballast water are killed and inactivated while colliding with the moving particles which collide with one another and cause friction.

The hydro crusher 20 according to an embodiment of the present disclosure is configured to prevent the moving particles included therein from being discharged to the outside by the ballast water, and to keep the moving particles in the hydro crusher 20.

According to an embodiment of the present disclosure, the hydro crusher 20 may be installed on the main pipe disposed between the sea chest 10 and the ballast water storage tank 40. Herein, the main pipe provides a path to allow the ballast water to move from the sea chest 10 to the ballast water storage tank 40.

In the specification of the present application, the main pipe disposed between the sea chest 10 and the hydro crusher 20 is referred to as the main pipe L1, the main pipe disposed between the hydro crusher 20 and a sterilization unit 90 is referred to as the main pipe L2, and the main pipe disposed between the sterilization unit 90 and the ballast water storage tank 40 is referred to as the main pipe L3.

The ballast water is pumped from the sea chest 10 by the pump P1 installed on the main pipe L1, and flows into the hydro crusher 20.

Living organisms included in the ballast water flowing into the hydro crusher 20 are killed by physical movement of moving particles, such as collision, friction, or the like, caused by the vortex flow generated according to the shape of the hydro crusher 20 and the flow velocity and the hydraulic pressure of the ballast water, and then the ballast water is discharged to the outside of the hydro crusher 20.

A detailed description of the hydro crusher 20 may be replaced with the descriptions of FIGS. 1 to 8.

In the present embodiment, the sterilization unit 90 may sterilize the ballast water by using ozone, UV, or electrolysis. Any device that can sterilize ballast water can be applied to the present embodiment as the sterilization unit 90.

For example, Korean Patent Application No. 2013-0107176 (filing date: Sep. 6, 2013, the title of the invention: Apparatus and Method for Auto Control of Concentration and Flow of Ozone Gas Through TRO Concentration Measurement in Ballast Water Sterilization System Using Ozone) discloses technology of sterilizing ballast water using ozone. The technology disclosed in the above-described patent application is incorporated as a portion of the specification of the present application within the scope which does not conflict with the present disclosure.

In another example, Korean Patent Application No. 2010-0035788 (filing date: Apr. 19, 2010, the title of the invention: Ballast Water Sterilizing Apparatus) discloses technology of sterilizing ballast water using ultraviolet rays. The technology disclosed in the above-described patent application is incorporated as a portion of the specification of the present application within the scope which does not conflict with the present disclosure.

In still another example, Korean Patent Application No. 2011-0067818 (filing date: Jul. 8, 2011, the title of the invention: Method for Treating Ballast Water Using Electrolysis Unit) discloses technology of sterilizing ballast water using electrolysis. The technology disclosed in the above-described patent application is incorporated as a portion of the specification of the present application within the scope which does not conflict with the present disclosure.

In yet another example, the sterilization unit 90 may have the same configuration as that of the hydro crusher 20 according to an embodiment of the present disclosure.

That is, the sterilization unit 90 enhances sterilization performance of ballast water by sterilizing ballast water sterilized by the hydro crusher 20 primarily again.

Furthermore, in the case of chemical sterilization, when the sterilization unit 90 sterilizes the ballast water along with the hydro crusher 20, less oxidizing agent contributing to sterilization is used than when the sterilization unit 90 sterilizes the ballast water without the hydro crusher 20. As a result, compositional equipment for the ballast water can be miniaturized and fewer resources are used.

For example, when the sterilization unit 90 is a device which sterilizes ballast water by using ozone, the sterilization unit 90 may sterilize the ballast water by using a relatively less amount of ozone. In another example, when the sterilization unit 90 is a device which sterilizes the ballast water by using UV or electrolysis, the sterilization unit 90 may sterilize the ballast water by using relatively less power. Accordingly, compositional equipment can be miniaturized.

The ballast water storage tank 40 according to the present embodiment stores the ballast water sterilized by the hydro crusher 20 and the sterilization unit 90. The ballast water stored in the ballast water storage tank 40 may be discharged to the outside through a pipe L4 connected to the ballast water storage tank 40 when necessary. When being discharged to the outside, the ballast water may be discharged as it is or may be discharged after being neutralized by a neutralizing agent according to how the sterilization unit 90 operates. For example, when the sterilization unit 90 sterilizes the ballast water by using ozone, the ballast water stored in the ballast water storage tank 40 may be neutralized by a neutralizing agent and then may be discharged. Korean Patent Application No. 2009-0023795 (filing date: Mar. 20, 2009, the title of the invention: Apparatus and Method for Neutralizing Ballast Water) discloses technology of neutralizing ozone gas and then discharging the ozone to the outside. The technology disclosed in the above-described patent application is incorporated as a portion of the specification of the present application within the scope which does not conflict with the present disclosure.

Figure 10:
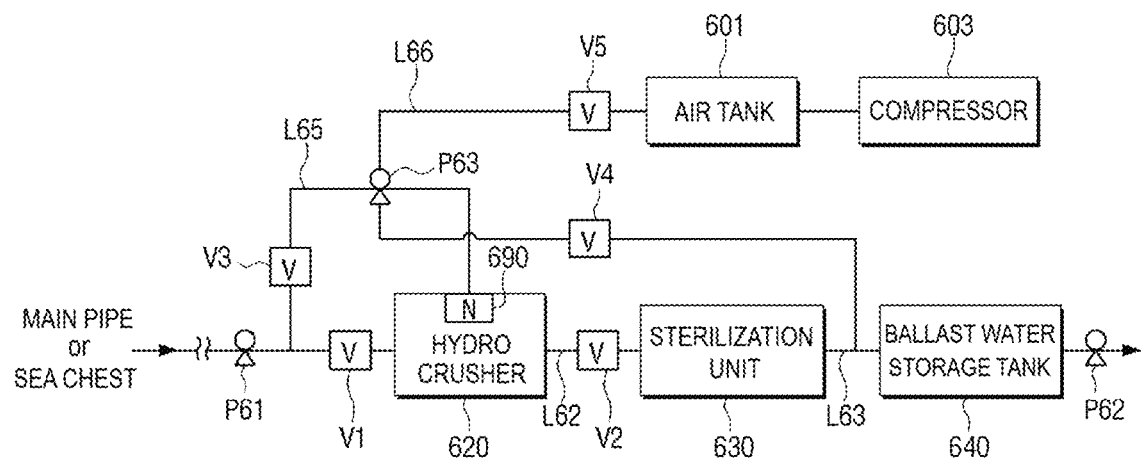
FIG. 10 is a view to illustrate a ballast water treatment system using a hydro crusher for water treatment, including a nozzle according to another embodiment of the present disclosure.

FIG. 10 is a view to illustrate a ballast water treatment system using a hydro crusher for water treatment which includes a nozzle according to another embodiment of the present disclosure.

Referring to FIG. 10, the ballast water treatment system according to the present embodiment may include ballast water main pipes L61, L62, L63, a hydro crusher 620 for ballast water treatment (hereinafter, a "hydro crusher"), a ballast water storage tank 640, a pump P61, an air tank 601, and a compressor 603.

The compressor 603 receives the air from the outside and compresses the air, and supplies the compressed air to the air tank 601.

The main pipes provide a path to allow ballast water existing in a sea chest (or a main pipe connected to the sea chest) to move to the ballast water storage tank 640.

In the specification of the present application, the main pipe disposed between the sea chest (the main pipe connected to the sea chest) and the hydro crusher 620 is referred to as the main pipe L61, the main pipe disposed between the hydro crusher 620 and the sterilization unit 630 is referred to as the main pipe L62, and the main pipe disposed between the sterilization unit 630 and the ballast water storage tank 640 is referred to as the main pipe L63.

The pump P61 may be installed on the main pipe L61 to pump ballast water directly from sea water or from the sea chest, and to provide the ballast water to the hydro crusher 620.

The hydro crusher 620 may be installed on the main pipe disposed between the sea chest (or the main pipe connected to the sea chest) and the ballast water storage tank 640.

The hydro crusher 620 according to the present embodiment includes moving particles, and the moving particles collide with one another while being moved by the ballast water. The ballast water may be sterilized while passing through the moving particles colliding with one another, and then may be discharged to the outside of the hydro crusher 620. In addition, the hydro crusher 620 in the present embodiment may include a nozzle 690 to spray a back washing material, and the back washing material may be ballast water or air.

The ballast water treatment system may further include a pump P63 and a central controller (not shown) to provide the back washing material to the hydro crusher 620.

The pump P63 may pump the air from the air tank 601 or pump the ballast water, and may provide the air or the ballast water to the nozzle 690 of the hydro crusher 620.

The central controller may control the pump P63 to pump the back washing material according to a predetermined period, and to supply the back washing material to the nozzle 690 of the hydro crusher 620, and accordingly, may periodically remove foreign substances attached to a filter.

The ballast water treatment system in the present embodiment may further include the sterilization unit 630, and the sterilization unit 630 may be installed between the hydro crusher 620 and the ballast water storage tank 640, and may receive the ballast water discharged from the hydro crusher 620 through the main pipe L62, and may sterilize the ballast water. A detailed description of the sterilization unit may be replaced with the description of the embodiment of FIG. 1.

An operation of using the ballast water as the back washing material (hereinafter, a "back washing mode 1"), and an operation of using the air as the back washing material (hereinafter, a "back washing mode 2") may be performed. Hereinafter, a ballast water mode and an air mode will be described in sequence.

Back washing mode 1

In the ballast water mode, the present ballast water treatment system performs an operation of pumping, by the pump P63, ballast water, and providing the ballast water to the nozzle 690 of the hydro crusher 620 as the bask washing material.

A valve V4 is opened and valves V5 and V1 are closed. These valves are opened or closed manually or automatically by a control device, such as a central controller (not shown).

In the present embodiment, the pump P63 may pump the ballast water which is sterilized by the sterilization unit 630 and is then discharged, and flows through the main pipe L63, and may provide the ballast water as the back washing material, as shown in FIG. 10. Alternatively, the pump P63 may pump the ballast water which is sterilized by the hydro crusher 620 and is then discharged, and flows through the main pipe L62, and may provide the ballast water as the back washing material.

Back washing mode 2

In the air mode, the present ballast water treatment system performs an operation of pumping, by the pump P63, THE air and providing the air to the nozzle 690 of the hydro crusher 620 as the bask washing material.

The valve V5 is opened and the valves V4 and V1 are closed. These valves are opened or closed manually or automatically by a control device, such as a central controller (not shown).

In the present embodiment, the pump P63 may pump the air stored in the air tank 601, and may provide the air to the nozzle 690 of the hydro crusher 620.

Figure 11:
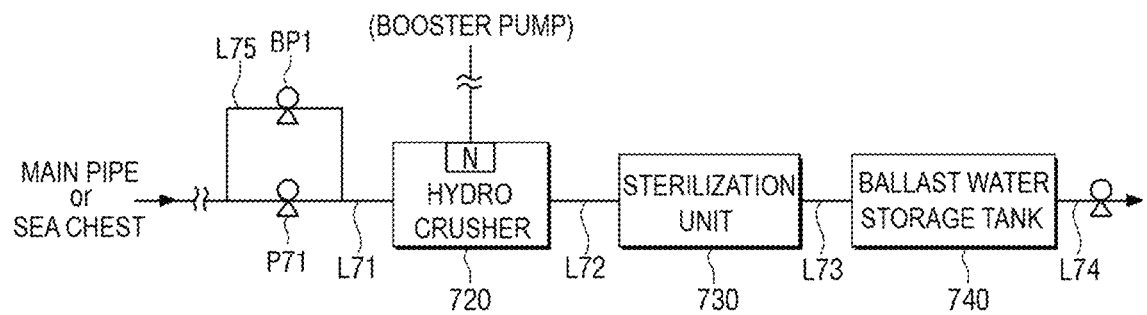
FIG. 11 is a view to illustrate a ballast water treatment system including a booster pump according to another embodiment of the present disclosure.
Figure 13A:
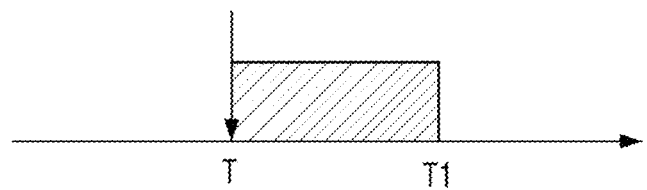
FIG. 13A and FIG. 13B are views to illustrate a predetermined time for which the booster pump is operated according to an embodiment of the present disclosure.
Figure 13B:
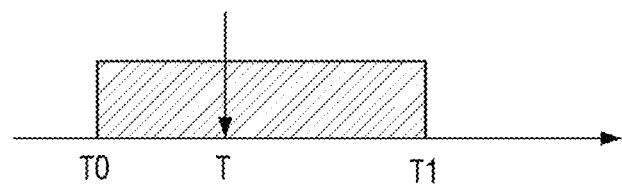

FIG. 11 is a view to illustrate a ballast water treatment system including a booster pump according to another embodiment of the present disclosure, and FIGS. 13A and 13B are views to illustrate a predetermined time for which the booster pump operates according to an embodiment of the present disclosure.

Referring to FIG. 11, the ballast water treatment system according to the present embodiment may include ballast water main pipes L71, L72, L73, a hydro crusher 720 for water treatment (hereinafter, a "hydro crusher"), a ballast water storage tank 740, a pump P71, and a booster pump BP1.

Compared with the embodiment of FIG. 9, the embodiment of FIG. 11 differs from the embodiment of FIG. 9 in that the ballast water treatment system further includes the booster pump BP1, and is the same as the embodiment of FIG. 9 except for this feature. Therefore, the difference from the embodiment of FIG. 9 will be highlighted.

The main pipes provide a path to allow ballast water existing in a sea chest (or main pipe connected to the sea chest) to move to the ballast water storage tank 740.

In the specification of the present application, the main pipe disposed between the sea chest (or the main pipe connected to the sea chest) and the hydro crusher 720 is referred to as the main pipe L71, the main pipe disposed between the hydro crusher 720 and a sterilization unit 730 is referred to as the main pipe L72, and the main pipe disposed between the sterilization unit 730 and the ballast water storage tank 740 is referred to as the main pipe L73 for the sake of explanation.

The pump P71 may be installed on the main pipe L71 to pump ballast water directly from sea water or from the sea chest, and to provide the ballast water to the hydro crusher 720.

The booster pump BP1 may pump sea water directly from sea water or from the sea chest or a tank (not shown) temporarily storing sea water, and may provide the sea water to a fluid inflow line L75 for a booster.

The booster pump BP1 may provide a fluid for the booster, flowing through the fluid inflow line L75 for the booster, to the hydro crusher 720, from a time T when ballast water starts to flow into the hydro crusher 720 until a time when the ballast water flows enough to move (move up) moving particles in the hydro crusher 720 (hereinafter, "for a predetermined time"). This is because an amount of ballast water flowing through the main pipe L71 for the predetermined time is small and thus a flow velocity is low, and thus the ballast water is not sufficient to move (move up) the moving particles in the hydro crusher 720.

The "predetermined time" in the present embodiment refers to a period of time from the time T when the ballast water starts to flow into the hydro crusher 720 until the time T1 when the ballast water flows enough to move (move up) the moving particles in the hydro crusher 720 as shown in FIG. 13A.

According to another embodiment, the "predetermined time" may include a period of time from the time T when the ballast water starts to flow into the hydro crusher 720 to a previous time T0 or a next time T1 as shown in FIG. 13B, and the "predetermined time" is adjustable according to an amount of ballast water flowing through the main pipe L71.

The ballast water treatment system in the present embodiment may further include the sterilization unit 730, and the sterilization unit 730 may be installed between the hydro crusher 720 and the ballast water storage tank 740, and may receive the ballast water discharged from the hydro crusher 720 through the main pipe L72, and may sterilize the ballast water. A detailed description of the sterilization unit may be replaced with the description of the embodiment of FIG. 1.

Figure 12:
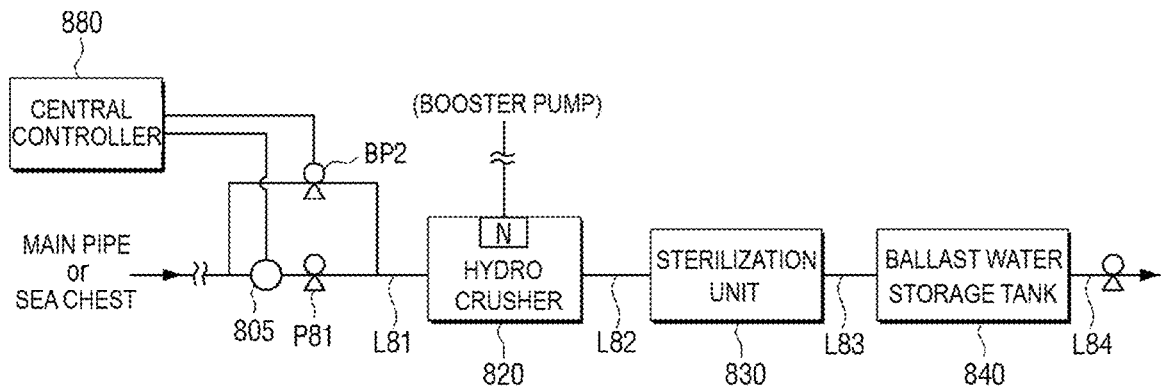
FIG. 12 is a view to illustrate a ballast water treatment system including a booster pump according to another embodiment of the present disclosure.

FIG. 12 is a view to illustrate a ballast water treatment system including a booster pump according to another embodiment of the present disclosure.

Referring to FIG. 12, the ballast water treatment system according to the present embodiment may include ballast water main pipes L81, L82, L83, a hydro crusher 820 for ballast water treatment (hereinafter, a "hydro crusher"), a ballast water storage tank 840, a sterilization unit 830, a pump P81, a booster pump BP2, a flow measurement device 805, and a central controller 880.

Comparing the embodiment of FIG. 12 and the embodiment of FIG. 11, both structures are the same, except for that the embodiment of FIG. 12 further includes the flow measurement device 805 and the central controller 880. Accordingly, the difference from the embodiment of FIG. 11 will be highlighted.

The central controller 880 according to the embodiment of FIG. 12 may control the booster pump BP2.

The flow measurement device 805 may include, for example, a flow sensor and a display. This is merely an example, and any device that can measure a flow can be applied to the present embodiment.

The central controller 880 according to the present embodiment may receive a result of measurement from the flow measurement device 805, and, when the received result is smaller than a pre-stored reference value, the central controller 880 may operate the booster pump BP2 to provide a fluid for a booster to the hydro crusher 820. On the other hand, when the result of measuring by the flow measurement device 805 is greater than the pre-stored reference value, the central controller 880 may stop operating the booster pump BP2.

The hydro crusher 720, 820 according to the embodiment of FIGS. 11 and 12 may include a body portion, a column, an inflow portion, a discharge portion, moving particles, and a filter in the same way as the hydro crusher 20 according to the embodiment of FIG. 2.

The hydro crusher 720, 820 according to another embodiment of FIGS. 11 and 12 may further include a nozzle in the same way as the hydro crusher 520 according to the embodiment of FIG. 8.

As described above, the hydro crusher according to various embodiments of the present disclosure described above with reference to FIGS. 1 to 8 can be applied to the ballast water treatment system described above with reference to FIGS. 9 to 12.

It will be understood by a person skilled in the art that various modifications or change can be made based on the descriptions of the present disclosure. Therefore, the scope of the present disclosure is defined not by the detailed description of the embodiments but by the appended claims and equivalents thereto.

What is claimed is:

1. A hydro crusher for water treatment, for removing living organisms from water to be treated, the hydro crusher comprising:
    a body portion which has a cylindrical shape, the body portion including an inner surface that defines an inner space, the inner surface including a lower surface relative to the direction of gravity, an upper surface relative to the direction of gravity and a side surface, wherein the body portion comprises an inflow portion to allow the water to be treated to be drawn into the inner space therethrough, the inflow portion disposed in a lower part of the body portion relative to the direction of gravity, and a discharge portion to discharge the water to be treated, drawn in through the inflow portion, after sterilization of the water to be treated, the discharge portion disposed in an upper part of the body portion relative to the direction of gravity;
    an inflow pipe coupled to the inflow portion, the inflow pipe including a first segment, a second segment, and at least one bend positioned between the first segment and the second segment, wherein the first segment is parallel to the lower surface and the second segment is perpendicular to the first segment;
    a column disposed in the inner space and directly fixed to the lower surface;
    solid particles disposed in at least a portion of the inner space which are movable in at least an upwards direction relative to the direction of gravity by the water to be treated, wherein the water to be treated includes living organisms, wherein the moveable solid particles are configured to collide with one another and the living organisms to sterilize the water to be treated;
    a filter configured to filter foreign substances existing in the water to be treated, wherein the filter is disposed between the inflow portion and the discharge portion, wherein the filter is coupled to the column and the side surface; and
    a nozzle coupled to the upper surface, the nozzle configured to spray a back washing material to remove foreign substances attached to the filter.

2. The hydro crusher of claim 1, wherein the inflow portion is disposed to allow the water to be treated, drawn in through the inflow portion, to flow in an oblique direction with respect to a center axis of the inner space.

3. The hydro crusher of claim 2, wherein the inflow portion is a portion which is filled with the movable solid particles, and is disposed to allow the water to be treated to be drawn in therethrough.

4. The hydro crusher of claim 1, wherein the movable solid particles comprise at least one of alumina, silicon carbide, ceramic beads, and silicon material.

5. The hydro crusher of claim 1, wherein the column is disposed at a center of the inner space.

6. The hydro crusher of claim 1, wherein an inside of the hydro crusher is divided into a first region and a second region by the filter, and the water to be treated flows into the first region and the water to be treated, flowing into the first region, moves to the second region through the filter,
    wherein the nozzle is configured to spray the back washing material over the filter in the second region.

7. The hydro crusher of claim 6, wherein the back washing material is water to be treated or air.

8. The hydro crusher of claim 7, wherein one end of the column is connected to the filter.

9. The hydro crusher of claim 8, wherein the discharge portion is connected to at least any one of the side surface or the upper surface of the inner surface.

* * * * *